United States Patent
Hashimoto

(10) Patent No.: US 12,260,977 B2
(45) Date of Patent: Mar. 25, 2025

(54) POWDER OF MAGNETOPLUMBITE-TYPE HEXAGONAL FERRITE, METHOD FOR PRODUCING THE SAME, AND RADIO WAVE ABSORBER

(71) Applicant: FUJIFILM Corporation, Tokyo (JP)

(72) Inventor: Hirokazu Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 902 days.

(21) Appl. No.: 17/173,437

(22) Filed: Feb. 11, 2021

(65) Prior Publication Data

US 2021/0166849 A1 Jun. 3, 2021

Related U.S. Application Data

(63) Continuation of application No. PCT/JP2019/022347, filed on Jun. 5, 2019.

(30) Foreign Application Priority Data

Aug. 28, 2018 (JP) .................. 2018-159192
May 27, 2019 (JP) .................. 2019-098735

(51) Int. Cl.
*H01F 1/34* (2006.01)
*C01G 49/00* (2006.01)
*H01Q 17/00* (2006.01)

(52) U.S. Cl.
CPC ......... *H01F 1/344* (2013.01); *C01G 49/0072* (2013.01); *H01Q 17/00* (2013.01); *C01P 2002/72* (2013.01); *C01P 2004/02* (2013.01)

(58) Field of Classification Search
CPC . H01F 1/344; C01G 49/0072; C01P 2002/72; C01P 2004/02; H01Q 17/00
See application file for complete search history.

(56) References Cited

U.S. PATENT DOCUMENTS

| | | | |
|---|---|---|---|
| 6,419,847 B1 * | 7/2002 | Toyota | C04B 35/62645 252/62.63 |
| 10,249,417 B2 * | 4/2019 | Morita | C01G 51/68 |
| 10,622,127 B2 | 4/2020 | Sakane et al. | |
| 10,919,778 B2 | 2/2021 | Sakane et al. | |
| 12,112,871 B2 * | 10/2024 | Hashimoto | C01G 49/0045 |
| 12,125,622 B2 * | 10/2024 | Hashimoto | H01F 1/348 |
| 2003/0044623 A1 | 3/2003 | Sakurai et al. | |
| 2003/0044633 A1 | 3/2003 | Nagaraj et al. | |
| 2003/0079893 A1 | 5/2003 | Hashimoto et al. | |
| 2004/0036645 A1 | 2/2004 | Fujieda et al. | |
| 2004/0227663 A1 | 11/2004 | Suzuki et al. | |
| 2005/0282043 A1 | 12/2005 | Yamazaki et al. | |
| 2007/0131894 A1 | 6/2007 | Takada et al. | |
| 2007/0241962 A1 | 10/2007 | Shinoda et al. | |
| 2009/0266604 A1 | 10/2009 | Tokiwa | |
| 2010/0060539 A1 | 3/2010 | Suetsuna et al. | |
| 2010/0238063 A1 | 9/2010 | Ohkoshi et al. | |
| 2012/0100064 A1 | 4/2012 | Ohkoshi et al. | |
| 2012/0105185 A1 | 5/2012 | Oda et al. | |
| 2013/0140076 A1 | 6/2013 | Lee et al. | |
| 2014/0091501 A1 | 4/2014 | Hattori et al. | |
| 2015/0187380 A1 | 7/2015 | Shirata | |
| 2017/0275438 A1 | 9/2017 | Kobayashi et al. | |
| 2018/0009677 A1 | 1/2018 | Aga et al. | |
| 2018/0370197 A1 | 12/2018 | Nagamune et al. | |
| 2019/0051436 A1 | 2/2019 | Imaoka et al. | |
| 2019/0215994 A1 | 7/2019 | Hiroi et al. | |
| 2019/0312356 A1 | 10/2019 | Fujita et al. | |
| 2019/0380232 A1 | 12/2019 | Machinaga et al. | |
| 2020/0008328 A1 | 1/2020 | Hiroi et al. | |
| 2020/0227833 A1 | 7/2020 | Hiroi et al. | |
| 2020/0335247 A1 | 10/2020 | Hosoya et al. | |
| 2021/0151895 A1 | 5/2021 | Ohkoshi et al. | |
| 2021/0179442 A1 | 6/2021 | Chen et al. | |
| 2021/0194147 A1 | 6/2021 | Nagano | |
| 2022/0039301 A1 | 2/2022 | Hashimoto | |
| 2022/0059945 A1 | 2/2022 | Hashimoto | |
| 2022/0059946 A1 | 2/2022 | Hashimoto | |
| 2022/0061198 A1 | 2/2022 | Shirata et al. | |

(Continued)

FOREIGN PATENT DOCUMENTS

| CN | 102473514 A | 5/2012 |
|---|---|---|
| CN | 102473519 A | 5/2012 |

(Continued)

OTHER PUBLICATIONS

Clarivate Analytics machine translation of JP 5161813 B2 to Hitomi et al. published Mar. 13, 2013 (Year: 2013).*
Vinnik et al. "Growth of lead and aluminum substituted barium hexaferrite single crystals from lead oxide flux", Materials Science Forum, vol. 843, pp. 3-9. Published online Dec. 28, 2015 (Year: 2015).*
Shono et al. "Magneto-optical properties of magnetoplumbites BaFe12O19, SrFe12—xAlxO19 and PbFe12O19", Japanese Journal of Applied Physics, vol. 21, No. 10, pp. 1415-1454. Oct. 1982 (Year: 1982).*
Naoufal et al. "synthesis, structure and catalytic properties of Fe-substituted barium hexaaluminates", Catalyst Letters, 54, 1998, 141-148. Sep. 1998 (Year: 1998).*

(Continued)

*Primary Examiner* — Jane L Stanley
(74) *Attorney, Agent, or Firm* — Sughrue Mion, PLLC

(57) ABSTRACT

The powder of the magnetoplumbite-type hexagonal ferrite is an aggregate of particles of a compound represented by Formula (1), and, in a particle size distribution based on number measured by a laser diffraction scattering method, in a case where a mode value is defined as a mode diameter, a diameter at a cumulative percentage of 10% is defined as D10 and a diameter at a cumulative percentage of 90% is defined as D90, the mode diameter is equal to or greater than 5 μm and less than 10 μm and an expression of (D90−D10)/mode diameter≤3.0 is satisfied. In Formula (1), A represents at least one metal element selected from the group consisting of Sr, Ba, Ca, and Pb, and x satisfies 1.5≤x≤8.0.

$$AFe_{(12-x)}Al_xO_{19} \qquad \text{Formula(1)}$$

10 Claims, No Drawings

(56) References Cited

U.S. PATENT DOCUMENTS

| | | | |
|---|---|---|---|
| 2022/0167535 A1 | 5/2022 | Nakai et al. | |
| 2022/0376402 A1 | 11/2022 | Hashimoto | |
| 2023/0360828 A1* | 11/2023 | Fukagawa | H01F 1/348 |

FOREIGN PATENT DOCUMENTS

| | | |
|---|---|---|
| CN | 107032776 A | 8/2017 |
| CN | 107227023 A | 10/2017 |
| CN | 107406272 A | 11/2017 |
| CN | 108370654 A | 8/2018 |
| CN | 109265155 A | 1/2019 |
| DE | 37 29 693 A1 | 5/1988 |
| EP | 2 708 513 A1 | 3/2014 |
| EP | 3 435 386 A1 | 1/2019 |
| EP | 3 573 439 A1 | 11/2019 |
| EP | 3 643 752 A1 | 4/2020 |
| EP | 3 943 451 A1 | 1/2022 |
| EP | 3 537 860 B1 | 10/2022 |
| JP | 57-180206 A | 11/1982 |
| JP | 63-155700 A | 6/1988 |
| JP | 64-000707 A | 1/1989 |
| JP | 5-206676 A | 8/1993 |
| JP | 7-030279 A | 1/1995 |
| JP | 8-340191 A | 12/1996 |
| JP | 9-115708 A | 5/1997 |
| JP | 11-354972 A | 12/1999 |
| JP | 2000-228599 A | 8/2000 |
| JP | 2000-232294 A | 8/2000 |
| JP | 2001-156487 A | 6/2001 |
| JP | 2002-118008 A | 4/2002 |
| JP | 2002-185180 A | 6/2002 |
| JP | 2002-217586 A | 8/2002 |
| JP | 2003-282319 A | 10/2003 |
| JP | 2003-332784 A | 11/2003 |
| JP | 2004-96084 A | 3/2004 |
| JP | 2004-296541 A | 10/2004 |
| JP | 2005-033156 A | 2/2005 |
| JP | 2005-231931 A | 9/2005 |
| JP | 2007-129179 A | 5/2007 |
| JP | 2007-250823 A | 9/2007 |
| JP | 2008-021990 A | 1/2008 |
| JP | 2008-63199 A | 3/2008 |
| JP | 2008-169378 A | 7/2008 |
| JP | 4173424 B2 | 10/2008 |
| JP | 2008-300801 A | 12/2008 |
| JP | 2010-077198 A | 4/2010 |
| JP | 2010-114407 A | 5/2010 |
| JP | 2010-184840 A | 8/2010 |
| JP | 2010-260766 A | 11/2010 |
| JP | 2010-283301 A | 12/2010 |
| JP | 4674380 B2 | 4/2011 |
| JP | 2011-093762 A | 5/2011 |
| JP | 2011-178654 A | 9/2011 |
| JP | 2012-009797 A | 1/2012 |
| JP | 5161813 B2 * | 3/2013 ............... H01F 1/00 |
| JP | 2013-526775 A | 6/2013 |
| JP | 2013-239637 A | 11/2013 |
| JP | 5481538 B2 | 4/2014 |
| JP | 2015-127985 A | 7/2015 |
| JP | 2016-204499 A | 12/2016 |
| JP | 2018-056492 A | 4/2018 |
| JP | 2018-110167 A | 7/2018 |
| JP | 2018-147999 A | 9/2018 |
| JP | 2018-154541 A | 10/2018 |
| JP | 2019-012799 A | 1/2019 |
| JP | 6521415 B2 | 5/2019 |
| JP | 2019-104954 A | 6/2019 |
| KR | 10-0675514 B1 | 1/2007 |
| WO | 2016/117648 A1 | 7/2016 |
| WO | 2018/084234 A1 | 5/2018 |
| WO | 2018/168859 A1 | 9/2018 |
| WO | 2018/235952 A1 | 12/2018 |
| WO | 2019/004104 A1 | 1/2019 |
| WO | 2019/017471 A1 | 1/2019 |
| WO | 2019/131675 A1 | 7/2019 |

OTHER PUBLICATIONS

Luo et al. "Physical and magnetic properties of highly aluminum doped strontium ferrite nanoparticles prepared by auto-combustion route", Journal of Magnetism and Magnetic Materials, 324, 2012, 2602-2608. published online Mar. 15, 2012 (Year: 2012).*
Notification of Reason for Refusal dated Jan. 14, 2022 from the Korean intellectual Property Office in KR Application No. 10-2021-7004268.
International Search Report dated Aug. 13, 2019 from the International Searching Authority in International Application No. PCT/JP2019/022347.
Written Opinion dated Aug. 13, 2019 from the International Bureau in International Application No. PCT/JP2019/022347.
International Preliminary Report on Patentability dated Mar. 2, 2021 from the International Bureau in International Application No. PCT/JP2019/022347.
Office Action issued May 25, 2023 in U.S. Appl. No. 17/518,825.
K. Sadhana et al., "Structural and magnetic properties of nanocrystalline $BaFe_{12}O_{19}$ synthesized by microwave-hydrothermal method", Appl Nanosci, 2012, vol. 2, pp. 247-252 (6 pages).
Office Action issued Nov. 28, 2022 in Korean Application No. 10-2021-7035736.
Office Action issued Oct. 25, 2022 in Japanese Application No. 2021-519388.
Extended European Search Report dated Jun. 13, 2022 from the European Patent Office in EP Application No. 20806133.3.
International Search Report issued Jun. 30, 2020 in International Application No. PCT/JP2020/011872.
Written Opinion of the International Searching Authority issued Jun. 30, 2020 in International Application No. PCT/JP2020/011872.
International Preliminary Report on Patentability issued Nov. 16, 2021 in International Application No. PCT/JP2020/011872.
Extended European Search Report issued Jul. 1, 2022 in European Application No. 20806852.8.
Notice of Reasons for Refusal dated Oct. 25, 2022 from the Japanese Patent Office in Japanese Application No. 2021-519287.
Office Action dated Dec. 13, 2022 from the Korean Intellectual Property Office in KR Application No. 10-2021-7034485.
Japanese Office Action dated Apr. 18, 2023 in Japanese Application No. 2021-519287.
International Search Report dated Aug. 25, 2020 in International Application No. PCT/JP2020/018621.
Written Opinion of the International Searching Authority dated Aug. 25, 2020 in International Application No. PCT/JP2020/018621.
International Preliminary Report on Patentability dated Nov. 16, 2021 in International Application No. PCT/JP2020/018621.
Extended European Search Report dated May 30, 2022 in European Application No. 20805058.3.
Notice of Reasons for Refusal dated Jun. 21, 2022 from the Japanese Patent Office in Japanese Application No. 2021-519405.
Japanese Office Action dated Dec. 20, 2022 in Japanese Application No. 2021-519405.
Korean Office Action dated Dec. 19, 2022 in Korean Application No. 10-2021-7036224.
Office Action issued Jun. 29, 2023 in Korean Application No. 10-2021-7036224.
International Search Report issued Aug. 25, 2020 in International Application No. PCT/JP2020/018622.
Written Opinion of the International Searching Authority issued Aug. 25, 2020 in International Application No. PCT/JP2020/018622.
International Preliminary Report on Patentability issued Nov. 16, 2021 in International Application No. PCT/JP2020/018622.
Extended European Search Report dated May 30, 2022 in EP Application No. 20806265.3.
Office Action dated Jun. 21, 2022 issued from the Japanese Patent Office in JP Application No. 2021-519406.
Korean Office Action dated Dec. 19, 2022 in Korean Application No. 10-2021-7036117.

(56) References Cited

OTHER PUBLICATIONS

International Search Report dated Oct. 20, 2020 issued by the International Searching Authority in Application No. PCT/JP2020/029622.
Written Opinion dated Oct. 20, 2020 issued by the International Searching Authority in Application No. PCT/JP2020/029622.
International Preliminary Report on Patentability dated Feb. 8, 2022 with a Translation of the Written Opinion of the International Searching Authority in Application No. PCT/JP2020/029622.
Extended European Search Report dated Sep. 30, 2022 in EP Application No. 20852946.1.
Office Action dated Feb. 14, 2023 from the Japanese Patent Office in JP Application No. 2021-539210.
Office Action dated Mar. 21, 2023 from the Korean Intellectual Property Office in KR Application No. 10-2022-7004173.
International Search Report dated Dec. 8, 2020 in International Application No. PCT/JP2020/033846.
Written Opinion of the International Searching Authority dated Dec. 8, 2020 in International Application No. PCT/JP2020/033846.
International Preliminary Report on Patentability dated Apr. 5, 2022 in International Application No. PCT/JP2020/033846.
Extended European Search Report dated Oct. 24, 2022 in European Application No. 20871943.5.
Korean Office Action dated Apr. 7, 2023 in Korean Application No. 10-2022-7009991.
European Office Action dated Apr. 14, 2023 in European Application No. 20871943.5.
Office Action issued Aug. 3, 2023 in Chinese Application No. 202080035152.9.
Office Action dated Jul. 25, 2023 in Japanese Application No. 2021-539210.
International Search Report issued Aug. 18, 2020 in International Application No. PCT/JP2020/018479.
Written Opinion of the International Searching Authority issued Aug. 18, 2020 in International Application No. PCT/JP2020/018479.
International Preliminary Report on Patentability issued Nov. 16, 2021 in International Application No. PCT/JP2020/018479.
Extended European Search Report issued Oct. 1, 2021 in European Application No. 19854513.9.
Korean Office Action issued Sep. 25, 2023 in Application No. 10-2022-7004173.
Office Action issued Aug. 22, 2023 in European Application No. 20806852.8.
Office Action issued Nov. 30, 2023 in U.S. Appl. No. 17/518,825.
Office Action issued Oct. 28, 2023 in Chinese Application No. 202080035150.X.
Communication issued Dec. 14, 2023 in European Application No. 20 806 133.3.
Office Action issued Oct. 31, 2023 in Korean Application No. 10-2022-7009991, corresponding to U.S. Appl. No. 17/697,268.
Office Action issued Jan. 12, 2024 in U.S. Appl. No. 17/518,889.
Communication dated Dec. 15, 2023, issued in Chinese Application No. 202080033792.6.
Office Action issued Sep. 26, 2023 in Japanese Application No. 2021-519287.
Chinese Office Action dated Mar. 6, 2024 in Application No. 202080035479.6.
Communication dated Apr. 2, 2024, issued in Chinese Application No. 202080056518.0.
Notice of Allowance issued Apr. 22, 2024 in U.S. Appl. No. 17/518,889.
Office Action issued May 6, 2024 in U.S. Appl. No. 17/517,910.
Office Action issued May 9, 2024 in U.S. Appl. No. 17/697,268.
B.D. Cullity, et al., "Introduction To Magnetic Materials", 2nd Edition, 2009 by the Institute of Electrical and Electronics Engineers, John Wiley & Sons, Inc., 2009, pp. 1-550 (550 pages total).
Retno Rahmawati, et al., "Optimization of Frequency and Stirring Rate for Synthesis of Magnetite ($Fe_3O_4$) Nanoparticles by Using Coprecipitation-Ultrasonic Irradiation Methods", Procedia Engineering, 2017, vol. 170, pp. 55-59 (5 pages total).
Md Jafar Sharif, et al., "Enhanced magnetization in highly crystalline and atomically mixed bcc Fe—Co nanoalloys prepared by hydrogen reduction of oxide composites", Nanoscale, 2013, vol. 5, pp. 1489-1493 (5 pages total).
Notice of Allowance issued Jul. 3, 2024 in U.S. Appl. No. 17/518,825.
S. Kolev, et al., "Thermal Treatment Influence on the Magnetic Properties and Degree of Orientation of $BaFe_{12}O_{19}$ Films", J Supercond Nov Magn, 2012, vol. 25, pp. 2819-2824 (6 pages total).
Office Action issued Jun. 25, 2024 in U.S. Appl. No. 17/503,509.
Office Action issued May 8, 2024 in European Application No. 20 806 852.8.
Office Action issued Jul. 23, 2024 in European Application No. 20 805 058.3.
Office Action issued Aug. 27, 2024 in U.S. Appl. No. 17/697,268.
Office Action issued Jul. 20, 2024 in Chinese Application No. 202080033792.6.
Japanese Office Action dated Oct. 1, 2024 in Application No. 2023-111034; corresponds to U.S. Appl. No. 17/518,889.
Notice of Allowance issued Oct. 9, 2024 in U.S. Appl. No. 17/517,910.
Office Action issued Dec. 23, 2024 in U.S. Appl. No. 17/697,268.
Notice of Allowance issued Nov. 22, 2024 in U.S. Appl. No. 17/503,509.
Office Action issued Feb. 11, 2025, in U.S. Appl. No. 17/666,894.
Translation of JP 2010-077198 (of record) published Apr. 8, 2010.

\* cited by examiner

POWDER OF MAGNETOPLUMBITE-TYPE HEXAGONAL FERRITE, METHOD FOR PRODUCING THE SAME, AND RADIO WAVE ABSORBER

CROSS-REFERENCE TO RELATED APPLICATIONS

This application is a continuation application of International Application No. PCT/JP2019/022347, filed Jun. 5, 2019, the disclosure of which is incorporated herein by reference in its entirety. Further, this application claims priority from Japanese Patent Application No. 2018-159192, filed Aug. 28, 2018, and Japanese Patent Application No. 2019-098735, filed May 27, 2019, the disclosures of which are incorporated herein by reference in their entirety.

BACKGROUND OF THE INVENTION

1. Field of the Invention

The present disclosure relates to a powder of a magnetoplumbite-type hexagonal ferrite, a method for producing the same, and a radio wave absorber.

2. Description of the Related Art

In recent years, along with the diversification of the use of radio waves in high frequency bands, such as electronic toll collection systems (ETC), advanced cruise-assist highway systems (AHS), and satellite broadcasting, malfunctions and failures of electronic devices due to radio wave interference have been problems. In order to reduce the influence of such radio wave interference on electronic devices, a radio wave absorber absorbs unnecessary radio waves to prevent the reflection of the radio waves.

As a radio wave absorber, a radio wave absorber using a magnetic material is often used. A radio wave incident to the radio wave absorber including a magnetic material generates a magnetic field in the magnetic material. In a case where the generated magnetic field is reduced to radio wave energy, part of the energy is lost and absorbed. Accordingly, in the radio wave absorber including the magnetic material, a frequency band in which the effect is obtained differs depending on the type of the magnetic material used.

For example, JP4674380B discloses a magnetic powder for a radio wave absorber in which a peak particle size of laser diffraction scattering particle size distribution is 10 μm or more in a powder of a magnetoplumbite-type hexagonal ferrite represented by a composition formula $AFe_{(12-x)}Al_xO_{19}$, in which A is one or more of Sr, Ba, Ca, and Pb, and x is 1.0 to 2.2. According to the magnetic powder for a radio wave absorber disclosed in JP4674380B, excellent radio wave absorption performance is exhibited near 76 GHz.

SUMMARY OF THE INVENTION

However, in a thin film radio wave absorber (for example, film having a thickness of 500 μm or less; the same applies hereinafter) containing a powder of a magnetoplumbite-type hexagonal ferrite, as a content of the powder is high, radio wave absorption performance with respect to the film thickness increases. In the radio wave absorber of such a thin film having a high content of a powder of magnetoplumbite-type hexagonal ferrite, in a case where a particle size of the magnetoplumbite-type hexagonal ferrite is too large and the radio wave absorber is bent or pulled, there may be a problem regarding fracture due to particles. On the other hand, in a case where the particle size of the magnetoplumbite-type hexagonal ferrite is too small, magnetic properties of the magnetoplumbite-type hexagonal ferrite may be deteriorated and the radio wave absorption performance of the radio wave absorber may be deteriorated.

Regarding the point described above, JP4674380B does not disclose at all the problems described above that may occur in a thin-film radio wave absorber containing a powder of magnetoplumbite-type hexagonal ferrite.

An object of one aspect of the invention is to provide a powder of a magnetoplumbite-type hexagonal ferrite capable of producing a radio wave absorber having excellent radio wave absorption performance and sheet hardness, even in a case where it is formed as a thin film.

An object of another aspect of the invention is to provide a method for producing a powder of a magnetoplumbite-type hexagonal ferrite capable of producing a radio wave absorber having excellent radio wave absorption performance and sheet hardness, even in a case where it is formed as a thin film.

An object of still another aspect of the invention is to provide a radio wave absorber having excellent radio wave absorption performance and sheet hardness, even in a case where it is formed as a thin film.

A unit for achieving the objects includes the following aspects.

<1> A powder of a magnetoplumbite-type hexagonal ferrite which is an aggregate of particles of a compound represented by Formula (1), and in which, in a particle size distribution based on number measured by a laser diffraction scattering method, in a case where a mode value is defined as a mode diameter, a diameter at a cumulative percentage of 10% is defined as $D_{10}$ and a diameter at a cumulative percentage of 90% is defined as $D_{90}$, the mode diameter is equal to or greater than 5 μm and less than 10 μm and an expression of $(D_{90}-D_{10})/\text{mode diameter} \leq 3.0$ is satisfied.

$$AFe_{(12-x)}Al_xO_{19} \quad \text{Formula(1)}$$

In Formula (1), A represents at least one metal element selected from the group consisting of Sr, Ba, Ca, and Pb, and x satisfies $1.5 \leq x \leq 8.0$.

<2> The powder of a magnetoplumbite-type hexagonal ferrite according to <1>, in which x in Formula (1) satisfies $1.5 \leq x \leq 6.0$.

<3> The powder of a magnetoplumbite-type hexagonal ferrite according to <1> or <2>, in which a crystal phase is a single phase.

<4> The powder of a magnetoplumbite-type hexagonal ferrite according to any one of <1> to <3>, in which the powder of the magnetoplumbite-type hexagonal ferrite is used for a radio wave absorber.

<5> A method for producing the powder of a magnetoplumbite-type hexagonal ferrite according to any one of <1> to <4>, the method including:

a step A of obtaining a reaction product containing Fe, Al, and the at least one metal element selected from the group consisting of Sr, Ba, Ca, and Pb by a liquid phase method; and a step B of drying the reaction product obtained in the step A, thereby obtaining a dried product; and a step C of any one of a step of obtaining a fired product by firing the dried product obtained in the step B and pulverizing the obtained fired product or a step of obtaining a pulverized product by pulverizing the dried product obtained in the step B and firing the obtained pulverized product.

<6> The method for producing the powder of a magnetoplumbite-type hexagonal ferrite according to <5>, in which the step A includes a step of mixing an aqueous solution containing an Fe salt, an Al salt, and a salt of the at least one metal element with an alkali aqueous solution, thereby obtaining a reaction product.

<7> A radio wave absorber including: the powder of a magnetoplumbite-type hexagonal ferrite according to any one of <1> to <4>; and a binder.

According to one aspect of the invention, there is provided a powder of a magnetoplumbite-type hexagonal ferrite capable of producing a radio wave absorber having excellent radio wave absorption performance and sheet hardness, even in a case where it is formed as a thin film.

According to another aspect of the invention, there is provided a method for producing a powder of a magnetoplumbite-type hexagonal ferrite capable of producing a radio wave absorber having excellent radio wave absorption performance and sheet hardness, even in a case where it is formed as a thin film.

In addition, according to still another aspect of the invention, there is provided a radio wave absorber having excellent radio wave absorption performance and sheet hardness, even in a case where it is formed as a thin film.

DESCRIPTION OF THE PREFERRED EMBODIMENTS

Hereinafter, an example of an embodiment of a powder of a magnetoplumbite-type hexagonal ferrite to which the invention is applied will be described. Here, the invention is not limited to the embodiments hereinafter, and modifications can be suitably added within the range of the object of the invention.

A range of numerical values shown using "to" in the disclosure means a range including numerical values before and after "to" as a minimum value and a maximum value.

In the range of numerical values disclosed in stepwise in the disclosure, an upper limit value and a lower limit value disclosed in a certain range of numerical values may be replaced with an upper limit value and a lower limit value disclosed in another range of numerical values disclosed in stepwise. In addition, in the range of numerical values disclosed in the disclosure, an upper limit value and a lower limit value disclosed in a certain range of numerical values may be replaced with values shown in examples.

In the disclosure, a combination of two or more preferred aspects is a more preferred aspect.

In the disclosure, in a case where plural kinds of substances corresponding to each component are present, an amount of each component means the amount of all of the plural kinds of substances, unless otherwise noted.

In the disclosure, a term "step" does not only mean an individual step, but also include a case a step cannot be clearly differentiated from another step, in a case where the desired object of the step is achieved.

[Powder of Magnetoplumbite-Type Hexagonal Ferrite]

The powder of the magnetoplumbite-type hexagonal ferrite is an aggregate of particles of a compound represented by Formula (1), and, in a particle size distribution based on number measured by a laser diffraction scattering method, in a case where a mode value is defined as a mode diameter, a diameter at a cumulative percentage of 10% is defined as $D_{10}$ and a diameter at a cumulative percentage of 90% is defined as $D_{90}$ the mode diameter is equal to or greater than 5 μm and less than 10 μm and an expression of $(D_{90}-D_{10})/$ mode diameter≤3.0 is satisfied.

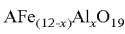    Formula(1)

In Formula (1), A represents at least one metal element selected from the group consisting of Sr, Ba, Ca, and Pb, and x satisfies 1.5≤x≤8.0.

As described above, in a thin-film radio wave absorber containing a powder of a magnetoplumbite-type hexagonal ferrite, as a content of the powder is high, radio wave absorption performance with respect to the film thickness increases. In the radio wave absorber of such a thin film having a high content of a powder of magnetoplumbite-type hexagonal ferrite, in a case where a particle size of the magnetoplumbite-type hexagonal ferrite is too large and the radio wave absorber is bent or pulled, there may be a problem regarding fracture due to particles. On the other hand, in a case where the particle size of the magnetoplumbite-type hexagonal ferrite is too small, magnetic properties of the magnetoplumbite-type hexagonal ferrite may be deteriorated and the radio wave absorption performance of the radio wave absorber may be deteriorated.

In contrast, the powder of the magnetoplumbite-type hexagonal ferrite of the disclosure can produce a radio wave absorber having excellent radio wave absorption performance and sheet hardness, even in a case where it is formed as a thin film.

The reason why the powder of the magnetoplumbite-type hexagonal ferrite of the disclosure can exert such an effect is not clear, but the inventors of the disclosure presume as follows.

However, the surmise hereinafter does not limitedly interpret the powder of the magnetoplumbite-type hexagonal ferrite of the disclosure and is described as an example.

The powder of the magnetoplumbite-type hexagonal ferrite of the disclosure is an aggregate of particles of the compound represented by Formula (1), and accordingly, excellent magnetic properties are exhibited. In addition, the powder of the magnetoplumbite-type hexagonal ferrite of the disclosure has a mode diameter equal to or greater than 5 μm in the particle size distribution based on number measured by a laser diffraction scattering method, and satisfies an expression of $(D_{90}-D_{10})/$mode diameter≤3.0, and accordingly, the number of fine particles deteriorating the magnetic properties is small. Further, the powder of the magnetoplumbite-type hexagonal ferrite of the disclosure has a mode diameter less than 10 μm in the particle size distribution based on number measured by the laser diffraction scattering method, and satisfies an expression of $(D_{90}-D_{10})/$mode diameter≤3.0, and accordingly, the number of coarse particles causing film fracture is small. From the above, it is considered that the powder of the magnetoplumbite-type hexagonal ferrite of the disclosure can produce a radio wave absorber having excellent radio wave absorption performance and sheet hardness, even in a case where it is formed as a thin film.

First, the powder of the magnetoplumbite-type hexagonal ferrite of the disclosure (hereinafter, also referred to as "magnetoplumbite-type hexagonal ferrite powder") will be described in detail.

The magnetoplumbite-type hexagonal ferrite powder of the disclosure is an aggregate of particles of a compound represented by Formula (1).

Regarding A in Formula (1), the kind or number of metal elements are not particularly limited as long as A is at least one metal element selected from the group consisting of Sr, Ba, Ca, and Pb.

For example, from a viewpoint of operability and handleability, A in Formula (1) is preferably at least one metal element selected from the group consisting of Sr, Ba, and Ca.

In addition, A in Formula (1) preferably contains Sr and is more preferably Sr, from a viewpoint that a radio wave absorber exhibiting excellent radio wave absorption performance near 79 GHz can be produced.

x in Formula (1) satisfies 1.5≤x≤8.0, preferably satisfies 1.5≤x≤6.0, more preferably satisfies 1.5≤x≤4.0, and even more preferably satisfies 1.5≤x≤3.0.

In a case where x in Formula (1) is 1.5 or more, radio waves in a frequency band higher than 60 GHz can be absorbed.

In addition, in a case where x in Formula (1) is 8.0 or less, the magnetoplumbite-type hexagonal ferrite has magnetism.

Examples of the magnetoplumbite-type hexagonal ferrite which is the compound represented by Formula (1) include $SrFe_{(10.44)}Al_{(1.56)}O_{19}$, $SrFe_{(10.00)}Al_{(2.00)}O_{19}$, $SrFe_{(9.95)}Al_{(2.05)}O_{19}$, $SrFe_{(9.85)}Al_{(2.15)}O_{19}$, $SrFe_{(9.79)}Al_{(2.21)}O_{19}$, $SrFe_{(9.74)}Al_{(2.26)}O_{19}$, $SrFe_{(9.58)}Al_{(2.42)}O_{19}$, $SrFe_{(9.37)}Al_{(2.63)}O_{19}$, $SrFe_{(9.33)}Al_{(2.67)}O_{19}$, $SrFe_{(9.27)}Al_{(2.73)}O_{19}$, $SrFe_{(7.88)}Al_{(4.12)}O_{19}$, $SrFe_{(7.71)}Al_{(4.29)}O_{19}$, $SrFe_{(7.37)}Al_{(4.63)}O_{19}$, $SrFe_{(7.04)}Al_{(4.96)}O_{19}$, $SrFe_{(6.25)}Al_{(5.75)}O_{19}$, $BaFe_{(9.50)}Al_{(2.50)}O_{19}$, $BaFe_{(10.05)}Al_{(1.95)}O_{19}$, $CaFe_{(10.00)}Al_{(2.00)}O_{19}$, $PbFe_{(9.00)}Al_{(3.00)}O_{19}$, $Sr_{(0.80)}Ba_{(0.10)}Ca_{(0.10)}Fe_{(9.83)}Al_{(2.17)}O_{19}$, and $Sr_{(0.80)}Ba_{(0.10)}Ca_{(0.10)}Fe_{(8.85)}Al_{(3.15)}O_{19}$.

The composition of the magnetoplumbite-type hexagonal ferrite is confirmed by high frequency inductively coupled plasma (ICP) emission spectroscopy.

Specifically, a pressure-resistant container containing 12 mg of sample powder and 10 mL of a 4 mol/L (liter; the same applies hereinafter) hydrochloric acid aqueous solution is held in an oven at a set temperature of 120° C. for 12 hours to obtain a solution. Next, 30 mL of pure water is added to the obtained solution, which is then filtered using a 0.1 μm membrane filter. Elemental analysis of the filtrate obtained as described above is performed using a high frequency inductively coupled plasma (ICP) emission spectrometer. Based on the obtained elemental analysis results, a content of each metal atom with respect to 100 atom % of iron atoms is obtained. The composition is confirmed based on the obtained content.

As the ICP emission spectrometer, for example, ICPS-8100 (model number) manufactured by Shimadzu Corporation can be suitably used. However, the ICP emission spectrometer is not limited thereto.

In the disclosure, a crystal phase of the magnetoplumbite-type hexagonal ferrite may or may not be a single phase, but is preferably a single phase.

In a case where a content of aluminum is the same, the powder of the magnetoplumbite-type hexagonal ferrite with a single crystal phase tends to have high coercivity and more excellent magnetic properties, compared to a powder of a magnetoplumbite-type hexagonal ferrite not having a single crystal phase (for example, having two crystal phases).

In the disclosure, the expression "the crystal phase is a single phase" indicates that only one kind of diffraction pattern showing a crystal structure of magnetoplumbite-type hexagonal ferrite having any composition is observed in powder X-ray diffraction (XRD) measurement.

On the other hand, in the disclosure, the expression "the crystal phase is not a single phase" indicates that there is such a case where a plurality of magnetoplumbite-type hexagonal ferrites of any composition are mixed, and two or more kinds of diffraction patterns are observed or diffraction patterns of crystal other than the magnetoplumbite-type hexagonal ferrite are observed.

In a case where the crystal phase is not a single phase, a diffraction pattern having a main peak and other peaks is obtained. Here, the "main peak" refers to a peak having the highest value of diffraction intensity in the observed diffraction pattern.

In a case where the powder of the magnetoplumbite-type hexagonal ferrite of the disclosure includes a powder of a magnetoplumbite-type hexagonal ferrite that is not a single phase, a ratio (Is/Im) of a value of the diffraction intensity of the other peak (hereinafter, referred to as "Is") to a value of the main peak (hereinafter, referred to as "Im") obtained by powder X-ray diffraction (XRD) measurement is, for example, preferably ½ or less more preferably ⅕ or less, from a viewpoint of producing a radio wave absorber having more excellent radio wave absorption performance.

In a case where two or more types of diffraction patterns are overlapped with each other and the peaks of the diffraction patterns have maximum values, the respective maximum values are defined as Im and Is, and the ratio thereof is obtained. In addition, in a case where two or more types of diffraction patterns are overlapped with each other and the other peak is observed as a shoulder of the main peak, the maximum intensity value of the shoulder is defined as Is and the ratio thereof is obtained.

In addition, in a case where there are two or more other peaks, a total value of the respective diffraction intensities is defined as Is, and the ratio thereof is obtained.

For the attribute of the diffraction pattern, for example, a database of the International Centre for Diffraction Data (ICDD: registered trademark) can be referred to.

For example, for the diffraction pattern of the magnetoplumbite-type hexagonal ferrite containing Sr, "00-033-1340" of the International Center for Diffraction Data (ICDD) can be referred to. However, in a case where a part of iron is substituted with aluminum, the peak position shifts.

As described above, the single crystal phase of the magnetoplumbite-type hexagonal ferrite is confirmed by the powder X-ray diffraction (XRD) measurement.

Specifically, a method of performing the measurement by using a powder X-ray diffractometer under the following conditions is used.

As the powder X-ray diffractometer, for example, an X'Pert Pro (product name) manufactured by PANalytical can be suitably used. However, the powder X-ray diffractometer is not limited thereto.

-Conditions-
  X-ray source: CuKα ray
  [Wavelength: 1.54 Å (0.154 nm), output: 40 mA, 45 kV]
  Scan range: 20°<2θ<70°
  Scan interval: 0.05°
  Scan speed: 0.75°/min The shape of the particles each configuring the magnetoplumbite-type hexagonal ferrite powder of the disclosure is not particularly limited, and examples thereof include a plate shape and an irregular shape.

In the magnetoplumbite-type hexagonal ferrite powder of the disclosure, in a particle size distribution based on number measured by a laser diffraction scattering method, in a case where a mode value is defined as a mode diameter, a diameter at a cumulative percentage of 10% is defined as $D_{10}$ and a diameter at a cumulative percentage of 90% is defined as $D_{90}$, the mode diameter is equal to or greater than 5 μm and less than 10 m and an expression of $(D_{90}-D_{10})/$mode diameter$\leq 3.0$ is satisfied.

The magnetoplumbite-type hexagonal ferrite powder of the disclosure has a mode diameter equal to or greater than 5 μm and satisfies an expression of $(D_{90}-D_{10})/$mode diameter$\leq 3.0$, and accordingly, the number of fine particles deteriorating the magnetic properties is small. Accordingly, according to the magnetoplumbite-type hexagonal ferrite powder of the disclosure, it is possible to produce a radio wave absorber having excellent radio wave absorption performance.

In addition, the magnetoplumbite-type hexagonal ferrite powder of the disclosure has a mode diameter less than 10 μm and satisfies an expression of $(D_{90}-D_{10})/$mode diameter$\leq 3.0$, and accordingly, the number of coarse particles causing film fracture is small. Accordingly, according to the magnetoplumbite-type hexagonal ferrite powder of the disclosure, it is possible to produce a radio wave absorber having excellent sheet hardness, even in a case where it is formed as a thin film.

For example, from a viewpoint of sheet hardness in a case where it is formed as a thin film, it is preferable that the mode diameter is 5 μm to 9.8 μm and the expression of $(D_{90}-D_{10})/$mode diameter$\leq 3.0$ is satisfied, it is more preferable that the mode diameter is 5 μm to 9.5 μm and the expression of $(D_{90}-D_{10})/$mode diameter$\leq 3.0$ is satisfied, and it is even more preferable that the mode diameter is 5 μm to 9 μm and the expression of $(D_{90}-D_{10})/$mode diameter$\leq 3.0$ is satisfied.

For example, from a viewpoint of radio wave absorption performance, it is preferable that the mode diameter is equal to or more than 5 μm and less than 10 μm and the expression of $(D_{90}-D_{10})/$mode diameter$\leq 2.5$ is satisfied, it is more preferable that the mode diameter is equal to or more than 5 μm and less than 10 μm and the expression of $(D_{90}-D_{10})/$mode diameter$\leq 2.0$ is satisfied, and it is even more preferable that the mode diameter is equal to or more than 5 μm and less than 10 μm and the expression of $(D_{90}-D_{10})/$mode diameter$\leq 1.5$ is satisfied.

The lower limit of "$(D_{90}-D_{10})/$mode diameter" is not particularly limited. The "$(D_{90}-D_{10})/$mode diameter" preferably satisfies a relationship of $0.3 \leq (D_{90}-D_{10})/$mode diameter, for example, and more preferably satisfies a relationship of $0.5 \leq (D_{90}-D_{10})/$the mode diameter.

The particle size (that is, mode diameter, $D_{10}$ and $D_{90}$) of the magnetoplumbite-type hexagonal ferrite powder can be controlled by classification with a sieve, a centrifuge, or the like, pulverization with a mortar and pestle, an ultrasonic disperser, or the like. For example, in a case of controlling the particle size of the magnetoplumbite-type hexagonal ferrite powder by pulverization, the particle size can be adjusted to a desired value by selecting a pulverization unit, pulverization time, a material of the medium, a medium diameter, and the like.

For example, according to the pulverization using a medium, the particle size of the magnetoplumbite-type hexagonal ferrite powder tends to decrease. For example, as the pulverization time is long, the particle size of the magnetoplumbite-type hexagonal ferrite powder tends to decrease. For example, as the medium diameter is smaller, the particle size of the magnetoplumbite-type hexagonal ferrite powder tends to decrease.

The value of "$(D_{90}-D_{10})/$mode diameter" can be adjusted to a desired value by selecting the particles by classifying with a sieve, a centrifuge or the like after pulverization.

The mode, the diameter at a cumulative percentage of 10%, the diameter at a cumulative percentage of 90% of the magnetoplumbite-type hexagonal ferrite powder of the disclosure are values obtained based on the particle size distribution based on number measured by the laser diffraction scattering method. Specifically, they are values measured by the following method.

500 mL of cyclohexanone is added to 10 mg of the magnetoplumbite-type hexagonal ferrite powder and diluted, stirred using a shaker for 30 seconds, and the obtained liquid is set as a sample for particle size distribution measurement. Then, the particle size distribution is measured by the laser diffraction scattering method using the sample for particle size distribution measurement. A laser diffraction/scattering particle size distribution measurement device is used as the measurement device.

As the laser diffraction/scattering particle size distribution measurement device, for example, Partica LA-960 (product name) manufactured by Horiba, Ltd. can be suitably used. However, the laser diffraction/scattering particle size distribution measurement device is not limited thereto.

A coercivity (Hc) of the magnetoplumbite-type hexagonal ferrite powder of the disclosure is preferably 700 kA/m or more, more preferably 730 kA/m or more, and even more preferably 750 kA/m or more.

In a case where the coercivity (Hc) of the magnetoplumbite-type hexagonal ferrite powder of the disclosure is 700 kA/m or more, it is possible to produce a radio wave absorber having excellent radio wave absorption performance.

The upper limit of the coercivity (He) of the magnetoplumbite-type hexagonal ferrite powder of the disclosure is not particularly limited, and for example, is preferably 1,500 kA/m or less.

A saturation magnetization ($\sigma s$) per unit mass of the magnetoplumbite-type hexagonal ferrite powder of the disclosure is preferably 10 $Am^2/kg$ or more, more preferably 20 $Am^2/kg$ or more, and even more preferably 30 $Am^2/kg$ or more.

In a case where the saturation magnetization ($\sigma s$) per unit mass of the magnetoplumbite-type hexagonal ferrite powder of the disclosure is 10 $Am^2/kg$ or more, it is possible to produce a radio wave absorber having more excellent radio wave absorption performance.

The upper limit of the saturation magnetization ($\sigma s$) per unit mass of the magnetoplumbite-type hexagonal ferrite powder of the disclosure is not particularly limited, and is preferably, for example, 60 $Am^2/kg$ or less.

The coercivity (Hc) and saturation magnetization ($\sigma s$) per unit mass of the magnetoplumbite-type hexagonal ferrite powder are values measured using a vibrating sample magnetometer under an environment of an atmosphere temperature of 23° C. and conditions of a maximum applied magnetic field of 3,589 kA/m and a magnetic field sweep speed of 1.994 kA/m/s (second).

As the vibrating sample magnetometer, for example, TM-TRVSM5050-SMSL (product name) manufactured by Tamagawa Manufacturing Co., Ltd. can be suitably used. However, the vibrating sample magnetometer is not limited thereto.

A ratio of a powder other than the magnetoplumbite-type hexagonal ferrite powder in the entire powder of the magnetoplumbite-type hexagonal ferrite of the disclosure is, for example, preferably 20 mass % or less, more preferably 10 mass % or less, even more preferably 5 mass % or less, particularly preferably 0 mass % or less, that is, not to include the powder other than the magnetoplumbite-type hexagonal ferrite powder, from a viewpoint of producing a radio wave absorber having more excellent radio wave absorption performance.

<Uses of Magnetoplumbite-Type Hexagonal Ferrite Powder>

The magnetoplumbite-type hexagonal ferrite powder of the disclosure has excellent magnetic properties, and thus is suitably used for a radio wave absorber.

In addition, in the magnetoplumbite-type hexagonal ferrite powder of the disclosure, in a particle size distribution based on number measured by a laser diffraction scattering method, in a case where a mode value is defined as a mode diameter, a diameter at a cumulative percentage of 10% is defined as $D_{10}$ and a diameter at a cumulative percentage of 90% is defined as $D_{90}$, the mode diameter is equal to or greater than 5 μm and an expression of $(D_{90}-D_{10})$/mode diameter≤3.0 is satisfied. Accordingly, the number of fine particles deteriorating the magnetic properties is small. Accordingly, the radio wave absorber produced using the magnetoplumbite-type hexagonal ferrite powder of the disclosure has excellent radio wave absorption performance.

In addition, in the magnetoplumbite-type hexagonal ferrite powder of the disclosure, in a particle size distribution based on number measured by a laser diffraction scattering method, in a case where a mode value is defined as a mode diameter, a diameter at a cumulative percentage of 10% is defined as $D_{10}$ and a diameter at a cumulative percentage of 90% is defined as $D_{90}$, the mode diameter is less than 10 μm and an expression of $(D_{90}-D_{10})$/mode diameter≤3.0 is satisfied. Accordingly, the number of coarse particles causing sheet fracture is small. Accordingly, the radio wave absorber produced using the magnetoplumbite-type hexagonal ferrite powder of the disclosure has excellent sheet hardness, even in a case where it is formed as a thin film.

[Method for Producing Magnetoplumbite-Type Hexagonal Ferrite Powder]

The method for producing the magnetoplumbite-type hexagonal ferrite powder of the disclosure is not particularly limited, as long as it can produce the magnetoplumbite-type hexagonal ferrite powder of the disclosure described above.

The magnetoplumbite-type hexagonal ferrite powder of the disclosure can also be produced by any method of a solid-phase method or a liquid phase method.

Examples of the method for producing the magnetoplumbite-type hexagonal ferrite powder of the disclosure by the solid-phase method include a method using $SrCO_3$, $Al_2O_3$, $\alpha\text{-}Fe_2O_3$, or the like as a raw material, and the like. For a general method for producing the magnetoplumbite-type hexagonal ferrite powder of the disclosure by the solid-phase method, paragraphs [0023] to [0025] of JP4674380B can be suitably referred to.

As the method for producing the magnetoplumbite-type hexagonal ferrite powder of the disclosure, from a viewpoint of easily obtaining the magnetoplumbite-type hexagonal ferrite powder having more excellent magnetic properties, a method for producing the magnetoplumbite-type hexagonal ferrite powder of the embodiment which will be described below is preferable.

The method for producing the magnetoplumbite-type hexagonal ferrite powder of the embodiment (hereinafter, also referred to as a "producing method of the embodiment") includes a step A of obtaining a reaction product containing Fe, Al, and at least one metal element selected from the group consisting of Sr, Ba, Ca, and Pb (hereinafter, also referred to as a "specific metal element") by a liquid phase method, a step B of drying the reaction product obtained in the step A, thereby obtaining a dried product, and a step C of any one of a step of obtaining a fired product by firing the dried product obtained in the step B and pulverizing the obtained fired product (hereinafter, also referred to as a "step c1") or a step of obtaining a pulverized product by pulverizing the dried product obtained in the step B and firing the obtained pulverized product (hereinafter, also referred to as a "step c2").

The step A, the step B, and the step C may each be divided into two or more stages.

Hereinafter, each step will be described in detail.

<Step A>

The step A is a step of obtaining a reaction product containing Fe, Al, and at least one metal element selected from the group consisting of Sr, Ba, Ca, and Pb (that is, specific metal element) by a liquid phase method.

In the step A, a reaction product serving as a precursor of the magnetoplumbite-type hexagonal ferrite powder can be obtained. It is surmised that the reaction product obtained in the step A is an iron hydroxide, an aluminum hydroxide, or a composite hydroxide of iron, aluminum, and the specific metal element.

The step A preferably includes a step of mixing an aqueous solution containing an Fe salt, an Al salt, and a salt of the specific metal element (hereinafter, also referred to as a "raw material aqueous solution") with an alkali aqueous solution, thereby obtaining a reaction product (hereinafter, referred to as "Step A1").

In the step A1, the raw material aqueous solution is mixed with the alkali aqueous solution to generate a precipitate of the reaction product. In the step A1, a solution containing a reaction product serving as a precursor of the magnetoplumbite-type hexagonal ferrite powder (so-called precursor-containing solution) can be obtained.

In addition, the step A preferably includes a step of performing solid-liquid separation of the reaction product obtained in step A1 (hereinafter, also referred to as "step A2").

In the step A2, a reaction product serving as a precursor of the magnetoplumbite-type hexagonal ferrite powder (that is, the reaction product in step A) can be obtained.

(Step A1)

The step A1 is a step of mixing an aqueous solution (that is, raw material aqueous solution) containing an Fe salt, an Al salt, and a salt of the specific metal element with an alkali aqueous solution, thereby obtaining a reaction product.

The salt of the Fe salt, the Al salt, and the salt of the specific metal element is not particularly limited, and for example, from viewpoints of availability and cost, water-soluble inorganic acid salts such as nitrates, sulfates, or chlorides are preferable.

Specific examples of the Fe salt include iron (III) chloride hexahydrate [$FeCl_3 \cdot 6H_2O$] and iron (III) nitrate nonahydrate [$Fe(NO_3)_3 \cdot 9H_2O$].

Specific examples of the Al salt include an aluminum chloride hexahydrate [$AlCl_3 \cdot 6H_2O$] and an aluminum nitrate nonahydrate [$Al(NO_3)_3 \cdot 9H_2O$].

Specific examples of the Sr salt include a strontium chloride hexahydrate [$SrCl_2 \cdot 6H_2O$], a strontium nitrate [$Sr(NO_3)_2$], and a strontium acetate hemihydrate [$Sr(CH_3COO)_2 \cdot 5H_2O$].

Specific examples of the Ba salt include a barium chloride dihydrate [$BaCl_2 \cdot 2H_2O$], a barium nitrate [$Ba(NO_3)_2$], and a barium acetate [$(CH_3COO)_2Ba$].

Specific examples of the Ca salt include a calcium chloride dihydrate [$CaCl_2 \cdot 2H_2O$], a calcium nitrate tetrahydrate [$Ca(NO_3)_2 \cdot 4H_2O$], and a calcium acetate monohydrate [$(CH_3COO)_2Ca\ H_2O$].

Specific examples of the Pb salt include lead (II) chloride [$PbCl_2$] and lead (II) nitrate [$Pb(NO_3)_2$].

The alkali aqueous solution is not particularly limited, and examples thereof include a sodium hydroxide aqueous solution and a potassium hydroxide aqueous solution.

A concentration of the alkali aqueous solution is not particularly limited, and may be, for example, 0.1 mol/L to 10 mol/L.

The raw material aqueous solution and the alkali aqueous solution may be simply mixed with each other.

The raw material aqueous solution and the alkali aqueous solution may be mixed in their entirety at once, or the raw material aqueous solution and the alkali aqueous solution may be gradually mixed little by little. Alternatively, the mixture may be added to one of the raw material aqueous solution and the alkali aqueous solution while the other is added little by little.

For example, from a viewpoint of reproducibility of the radio wave absorption performance, it is preferable that the raw material aqueous solution and the alkali aqueous solution are gradually mixed little by little.

The method of mixing the raw material aqueous solution and the alkali aqueous solution is not particularly limited, and examples thereof include a method of mixing by stirring.

A stirring unit is not particularly limited, and a general stirring tool or a stirring device can be used.

The stirring time is not particularly limited as long as the reaction of the components to be mixed is completed, and can be appropriately set according to the composition of the raw material aqueous solution, the type of the stirring tool or the stirring device, and the like.

The temperature at which the raw material aqueous solution and the alkali aqueous solution are mixed is, for example, preferably 100° C. or lower from a viewpoint of preventing bumping, and more preferably 95° C. or lower and even more preferably 15° C. to 92° C. from a viewpoint of obtaining a good reaction product.

A unit for adjusting the temperature is not particularly limited, and a general heating device, cooling device, or the like can be used.

The pH at 25° C. of the aqueous solution obtained by mixing the raw material aqueous solution and the alkali aqueous solution is, for example, preferably from 5 to 13 and more preferably from 6 to 12, from a viewpoint of more easily obtaining a reaction product.

A mixing ratio of the raw material aqueous solution and the alkali aqueous solution is not particularly limited, and for example, the amount of the alkali aqueous solution can be set to 0.1 parts by mass to 10.0 parts by mass with respect to 1 part by mass of the raw material aqueous solution.

(Step A2)

Step A2 is a step of performing solid-liquid separation of the reaction product obtained in step A1.

The method of performing solid-liquid separation is not particularly limited, and examples thereof include decantation, centrifugal separation, and filtration (suction filtration, pressure filtration, and the like).

In a case where the solid-liquid separation method is centrifugal separation, the conditions for centrifugal separation are not particularly limited. For example, centrifugal separation is preferably performed at a rotation speed of 2,000 revolutions per minute (rpm; the same applies hereinafter) for 3 minutes to 30 minutes. The centrifugal separation may be performed a plurality of times.

<Step B>

The step B is a step of drying the reaction product obtained in the step A, thereby obtaining a dried product (so-called precursor powder).

By drying the reaction product obtained in the step A before firing, the reproducibility of the radio wave absorption performance of the produced radio wave absorber is excellent. In addition, by drying the reaction product obtained in the step A before pulverization, it is easy to control the particle size distribution of the magnetoplumbite-type hexagonal ferrite powder by pulverization.

The drying unit is not particularly limited, and examples thereof include a dryer such as an oven.

The drying temperature is not particularly limited, and is, for example, preferably 50° C. to 200° C. and more preferably from 70° C. to 150° C.

The drying time is not particularly limited, and for example, is preferably 2 hours to 50 hours and more preferably 5 hours to 30 hours.

<Step C>

The step C is any one of a step of obtaining a fired product by firing the dried product obtained in the step B and pulverizing the obtained fired product (that is, step c1) or a step of obtaining a pulverized product by pulverizing the dried product obtained in the step B and firing the obtained pulverized product (that is, step c2).

The magnetoplumbite-type hexagonal ferrite powder having a desired particle size can be obtained by obtaining a fired product by firing the dried product obtained in the step B and pulverizing the obtained fired product or obtaining a pulverized product by pulverizing the dried product obtained in the step B and firing the obtained pulverized product.

The step C may be the step c1 or the step c2.

For example, from a viewpoint of making the magnetic properties after firing more uniform, the step C is preferably the step c2.

The Firing can be performed using a heating device.

The heating device is not particularly limited as long as it can heat to a target temperature, and any well-known heating device can be used. As the heating device, for example, in addition to an electric furnace, a firing device uniquely produced according to a production line can be used.

The firing is preferably performed in the atmosphere.

The firing temperature is not particularly limited, and is, for example, preferably 900° C. or higher, more preferably 900° C. to 1,400° C., and even more preferably 1,000° C. to 1,200° C.

The firing time is not particularly limited, and is, for example, preferably 1 hour to 10 hours and more preferably 2 hours to 6 hours.

The pulverization unit is not particularly limited, as long as a magnetoplumbite-type hexagonal ferrite powder having a desired particle size can be obtained.

Examples of the pulverization unit include a mortar and pestle, a pulverizer (ball mill, bead mill, roller mill, jet mill, hammer mill, attritor, or the like).

In the case of pulverizing using a medium, a particle size of the medium (so-called medium diameter) is not particularly limited, and for example, is preferably 0.1 mm to 5.0 mm and more preferably 0.5 mm to 3.0 mm.

In the disclosure, in a case of a spherical medium (for example, spherical beads), the "medium diameter" means a diameter of a medium (for example, beads), and in a case of a non-spherical medium (for example, non-spherical beads), the "medium diameter" means a diameter obtained by measuring a circle equivalent diameter of a plurality of media (for example, beads) from an observation image of a transmission electron microscope (TEM) or a scanning electron microscope (SEM) and arithmetically averaging the measured values.

The material of the medium is not particularly limited, and for example, a medium formed of glass, alumina, steel, zirconia, ceramic, or the like can be suitably used.

[Radio Wave Absorber]

The radio wave absorber of the disclosure includes the magnetoplumbite-type hexagonal ferrite powder of the disclosure (hereinafter, also referred to as "specific magnetoplumbite-type hexagonal ferrite powder") and a binder.

Since the radio wave absorber of the disclosure includes the specific magnetoplumbite-type hexagonal ferrite powder, the radio wave absorption performance and the sheet hardness are excellent, even in a case where it is formed as a thin film having a thickness of 500 µm.

In addition, in the radio wave absorber of the disclosure, by controlling the ratio of aluminum atoms to iron atoms (that is, the value of x in Formula (1)) in the specific magnetoplumbite-type hexagonal ferrite, it is possible to design the absorption wavelength of radio waves of the radio wave absorber, and it is possible to efficiently increase the absorption of radio waves at a desired frequency. Specifically, in the radio wave absorber of the disclosure, by increasing the ratio of aluminum atoms to iron atoms in the specific magnetoplumbite-type hexagonal ferrite (that is, increasing a value of x in Formula (1)), radio waves in a higher frequency band can be absorbed. Accordingly, excellent radio wave absorption performance can be exhibited, even in a high frequency band of 70 GHz to 90 GHz, for example.

The radio wave absorber of the disclosure may have a planar shape or a three-dimensional shape.

The planar shape thereof is not particularly limited, and examples thereof include a sheet shape and a film shape.

Examples of the three-dimensional shape include a polygonal column having a shape of a triangle or more, a column, a pyramid, a cone, a honeycomb, and the like. In addition, as the three-dimensional shape, a shape obtained by combining the above-described planar shape and the three-dimensional shape is also used.

The radio wave absorption performance of the radio wave absorber of the disclosure can be controlled not only by the content of the specific magnetoplumbite-type hexagonal ferrite powder in the radio wave absorber, but also by the shape of the radio wave absorber.

The radio wave absorber of the disclosure may include only one kind of the specific magnetoplumbite-type hexagonal ferrite powder, or may include two or more kinds thereof.

The radio wave absorber of the disclosure may include, for example, two or more kinds of the specific magnetoplumbite-type hexagonal ferrite powders having different compositions.

A content of the specific magnetoplumbite-type hexagonal ferrite powder in the radio wave absorber of the disclosure is not particularly limited, and is, for example, preferably equal to or greater than 10 mass %, more preferably equal to or greater than 30 mass %, and even more preferably equal to or greater than 50 mass % with respect to a total solid content of the radio wave absorber, from a viewpoint of radio wave absorption performance.

In addition, a content of the specific magnetoplumbite-type hexagonal ferrite powder in the radio wave absorber of the disclosure is, for example, preferably equal to or less than 98 mass %, more preferably equal to or less than 95 mass %, and even more preferably equal to or less than 92 mass % with respect to a total solid content of the radio wave absorber, from viewpoints of sheet hardness and manufacturing suitability of the radio wave absorber.

In the disclosure, in a case where the radio wave absorber does not contain a solvent, the total solid content in the radio wave absorber means a total mass of the radio wave absorber, and in a case where the radio wave absorber contains a solvent, the total solid content means a total mass excluding the solvent from the radio wave absorber.

The radio wave absorber of the disclosure includes a binder.

In the disclosure, the term "binder" is a general term for a substance that can maintain the specific magnetoplumbite-type hexagonal ferrite powder in a dispersed state and form a form of a radio wave absorber.

The binder is not particularly limited, and examples thereof include a resin, rubber, or thermoplastic elastomer (TPE).

Among these, as the binder, for example, a thermoplastic elastomer (TPE) is preferable, from a viewpoint of tensile strength and bending resistance.

The resin may be either a thermoplastic resin or a thermosetting resin.

Specific examples of the thermoplastic resin include an acrylic resin; polyacetal; polyamide; polyethylene; polypropylene; polyethylene terephthalate; polybutylene terephthalate; polycarbonate; polystyrene; polyphenylene sulfide; polyvinyl chloride; an acrylonitrile butadiene styrene (ABS) resin obtained by copolymerization of acrylonitrile, butadiene, and styrene; and an acrylonitrile styrene (AS) resin obtained by copolymerization of acrylonitrile and styrene.

Specific examples of the thermosetting resin include a phenol resin, an epoxy resin, a melamine resin, a urea resin, an unsaturated polyester, a diallyl phthalate resin, a urethane resin, and a silicon resin.

The rubber is not particularly limited and, for example, preferable examples thereof include synthetic rubber such as butadiene rubber; isoprene rubber; chloroprene rubber; halogenated butyl rubber; fluoro rubber; urethane rubber; acrylic rubber (ACM) obtained by copolymerization of acrylates (for example, ethyl acrylate, butyl acrylate, and 2-ethylhexyl acrylate) and other monomers; ethylene-propylene rubber obtained by coordination polymerization of ethylene and propylene using a Ziegler catalyst; butyl rubber (IIR) obtained by copolymerization of isobutylene and isoprene; styrene butadiene rubber (SBR) obtained by copolymerization of butadiene and styrene; acrylonitrile-butadiene rubber (NBR) obtained by copolymerization of acrylonitrile and butadiene; silicone rubber, from viewpoints that mixability with specific magnetoplumbite-type hexagonal ferrite powder is good and the radio wave absorber having more excellent durability, weather resistance, and impact resistance can be produced.

Specific examples of a thermoplastic elastomer include an olefin-based thermoplastic elastomer (TPO), a styrene-based thermoplastic elastomer (TPS), an amide-based thermoplastic elastomer (TPA), and a polyester-based thermoplastic elastomer (TPC).

In a case where the radio wave absorber of the disclosure contains rubber as the binder, it may contain various additives such as a vulcanizing agent, a vulcanization aid, a softener, and a plasticizer, in addition to the rubber.

Examples of the vulcanizing agent include sulfur, an organic sulfur compound, and a metal oxide.

A melt mass flow rate (hereinafter, also referred to as "MFR") of the binder is not particularly limited, and is, for example, preferably 1 g/10 min to 200 g/10 min, more preferably 3 g/10 min to 100 g/10 min, even more preferably 5 g/10 min to 80 g/10 min, and particularly preferably 10 g/10 min to 50 g/10 min.

In a case where the MFR of the binder is 1 g/10 min or more, fluidity is sufficiently high and the poor appearance is less likely to occur.

In a case where the MFR of the binder is 200 g/10 min or less, mechanical properties such as hardness of a molded body are more easily enhanced.

The MFR of the binder is a value measured under the conditions of a measurement temperature of 230° C. and a load of 10 kg according to JIS K 7210:1999.

The hardness of the binder is not particularly limited and is for example, preferably 5 g to 150 g, more preferably 10 g to 120 g, even more preferably 30 g to 100 g, and particularly preferably 40 g to 90 g, from a viewpoint of moldability.

The hardness of the binder is an instantaneous value measured according to JIS K 6253-3:2012.

The density of the binder is not particularly limited and is, for example, 600 kg/m$^3$ to 1,100 kg/m$^3$, more preferably 700 kg/m$^3$ to 1,000 kg/m$^3$, even more preferably 750 kg/m$^3$ to 1,050 kg/m$^3$, and particularly preferably 800 kg/m$^3$ to 950 kg/m$^3$, from a viewpoint of moldability.

The density of the binder is a value measured according to JIS K 0061:2001.

A 100% tensile stress of the binder is not particularly limited, and is for example, 0.2 MPa to 20 MPa, more preferably 0.5 MPa to 10 MPa, even more preferably 1 MPa to 5 MPa, and particularly preferably 1.5 MPa to 3 MPa, from a viewpoint of moldability.

A tensile strength of the binder is not particularly limited, and is for example, 1 MPa to 20 MPa, more preferably 2 MPa to 15 MPa, even more preferably 3 MPa to 10 MPa, and particularly preferably 5 MPa to 8 MPa, from a viewpoint of moldability.

An elongation at cut of the binder is not particularly limited and is for example, preferably 110% to 1,500%, more preferably 150% to 1,000%, even more preferably 200% to 900%, and particularly preferably 400% to 800%, from a viewpoint of moldability.

The tensile properties described above are values measured according to JIS K 6251:2010. The measurement is performed using a JIS No. 3 dumbbell as a test piece under the condition of a pulling speed of 500 mm/min.

The radio wave absorber of the disclosure may include only one kind of binder and may include two or more kinds thereof.

A content of the binder in the radio wave absorber of the disclosure is not particularly limited, and is, for example, preferably equal to or greater than 2 mass %, more preferably equal to or greater than 5 mass % and even more preferably equal to or greater than 8 mass % with respect to a total solid content of the radio wave absorber, from a viewpoint of dispersibility of the specific magnetoplumbite-type hexagonal ferrite powder and viewpoints of sheet hardness and manufacturing suitability of the radio wave absorber.

In addition, the content of the binder in the radio wave absorber is, for example, preferably equal to or smaller than 90 mass %, more preferably equal to or smaller than 70 mass %, and even more preferably equal to or smaller than 50 mass %, with respect to a total solid content of the radio wave absorber, from a viewpoint of radio wave absorption performance.

The radio wave absorber of the disclosure may include various additives (so-called other additives) as necessary, in addition to the specific magnetoplumbite-type hexagonal ferrite powder and the binder, as long as the effects of the embodiment do not impair.

Examples of other additives include a dispersing agent, a dispersing aid, fungicides, an antistatic agent, and an antioxidant. One component of the other additives may perform more than two functions.

The fact that the radio wave absorber contains the specific magnetoplumbite-type hexagonal ferrite powder can be confirmed, for example, by the following method.

After the radio wave absorber is finely chopped, it is immersed in a solvent (for example, acetone) for 1 or 2 days, and then dried. The structure can be confirmed by further finely grinding the dried radio wave absorber and performing powder X-ray diffraction (XRD) measurement. After cutting out the cross section of the radio wave absorber, the composition can be confirmed by using, for example, an energy dispersive X-ray analyzer.

In addition, after cutting the radio wave absorber into fine pieces, the measurement is performed by the laser diffraction scattering method using a solution ultrasonically dispersed in a solvent (for example, acetone) as a sample, thereby confirming the mode diameter, the particle size distribution, and the like.

[Method for Producing Radio Wave Absorber]

The method for producing the radio wave absorber of the disclosure is not particularly limited.

The radio wave absorber of the disclosure can be produced by a well-known method using the specific magnetoplumbite-type hexagonal ferrite powder, the binder, a solvent, and, as necessary, other components.

For example, a composition for a radio wave absorber containing the specific magnetoplumbite-type hexagonal ferrite powder, the binder, a solvent, and, as necessary, other components, is applied over a support and dried. Thereby, a radio wave absorber can be produced.

In addition, for example, a kneaded product is obtained by kneading the specific magnetoplumbite-type hexagonal ferrite powder, the binder, the solvent, and, as necessary, other components, and the obtained kneaded product is press-molded, thereby producing a radio wave absorber.

The solvent is not particularly limited and examples thereof include, for example, water, an organic solvent, or a mixed solvent of water and an organic solvent.

The organic solvent is not particularly limited, and examples thereof include an alcohol compound such as methanol, ethanol, n-propanol, i-propanol, or methoxypropanol, a ketone compound such as acetone, methyl ethyl ketone, cyclohexane, or cyclohexanone, tetrahydrofuran, acetonitrile, ethyl acetate, and toluene.

Among these, as the solvent, at least one kind selected from methyl ethyl ketone and cyclohexane is preferable, from viewpoints of a comparatively low boiling point and ease of drying.

The contents of the specific magnetoplumbite-type hexagonal ferrite powder and the binder in the composition for a radio wave absorber may be adjusted respectively so that the contents of the specific magnetoplumbite-type hexagonal ferrite powder and the binder in the finally obtained radio wave absorber become the contents of the specific magnetoplumbite-type hexagonal ferrite powder and the binder in the radio wave absorber described above.

A content of the solvent in the composition for a radio wave absorber is not particularly limited, and is suitably selected, for example, in accordance with the kind or amount of the component blended in the composition for a radio wave absorber.

In the composition for a radio wave absorber, the specific magnetoplumbite-type hexagonal ferrite powder and the binder may be simply mixed.

The method of mixing the specific magnetoplumbite-type hexagonal ferrite powder and the binder is not particularly limited, and examples thereof include a method of mixing by stirring.

A stirring unit is not particularly limited, and a general stirring device can be used.

As the stirring device, a mixer such as a paddle mixer or an impeller mixer is used.

The stirring time is not particularly limited, and for example, can be suitably set in accordance with the kind of the stirring device or the composition of the composition for a radio wave absorber.

The support is not particularly limited, and a well-known support can be used.

Examples of the material configuring the support include a metal plate (plate of metal such as aluminum, zinc, or copper), a plastic sheet [sheet of polyester (polyethylene terephthalate, polyethylene naphthalate, or polybutylene terephthalate), polyethylene (linear low-density polyethylene, low-density polyethylene, or high-density polyethylene), polypropylene, polystyrene, polycarbonate, polyimide, polyamide, polyamide imide, polysulfone, polyvinyl chloride, polyacrylonitrile, polyphenylene sulfide, polyether imide, polyether sulfone, polyvinyl acetal, or an acrylic resin], a plastic sheet on which metal described above is laminated or vapor-deposited.

The plastic sheet is preferably biaxially stretched.

The support can function to maintain the form of the radio wave absorber. In a case where the formed radio wave absorber can maintain its own form, the support may be removed from the radio wave absorber after producing the radio wave absorber, using a metal plate, a glass plate, or a plastic sheet having a surface subjected to a release treatment.

The shape, the structure, or the size of the support can be suitably selected according to the purpose.

The shape of the support is, for example, a flat plate shape.

The structure of the support may be a single-layered structure or a laminated structure of two or more layers.

A size of the support can be suitably selected according to the size of the radio wave absorber and the like.

The thickness of the support is not particularly limited, and is normally approximately 0.01 mm to 10 mm, for example, preferably 0.02 mm to 3 mm and more preferably 0.05 mm to 1 mm, from a viewpoint of handleability.

The method for applying the composition for a radio wave absorber on a support is not particularly limited, and examples thereof include methods using a die coater, a knife coater, an applicator, and the like.

The method for drying the composition for a radio wave absorber applied or ejected onto the support is not particularly limited, and examples thereof include a method using a heating device such as an oven.

The drying temperature and drying time are not particularly limited as long as the solvent in the composition for a radio wave absorber can be volatilized. As an example, the drying can be performed by heating at 30° C. to 150° C. for 0.01 to 2 hours.

EXAMPLES

Hereinafter, the invention will be described in detail with reference to examples, but the invention is not limited to the following examples, within a range not departing the gist thereof.

<Producing of Magnetoplumbite-Type Hexagonal Ferrite Powder>

-Producing of Magnetic Powder 1-

A total amount of a raw material aqueous solution prepared by dissolving 57.0 g of iron (III) chloride hexahydrate [$FeCl_3 \cdot 6H_2O$], 27.8 g of strontium chloride hexahydrate [$SrCl_2 \cdot 6H_2O$], and 10.2 g of aluminum chloride hexahydrate [$AlCl_3 \cdot 6H_2O$] in 216.0 g of water, and a total amount of a solution prepared by adding 113.0 g of water to 181.3 g of 5 mol/L sodium hydroxide aqueous solution were added to 400.0 g of water kept at 35° C. and stirred, respectively, at a flow rate of 10 mL/min and the same timing, to obtain a first solution.

Next, after changing the temperature of the first solution to 25° C., 39.8 g of a 1 mol/L sodium hydroxide aqueous solution was added to obtain a second solution. The pH of the obtained second solution was 10.5. The pH of the second solution was measured using a desktop pH meter #F-71 (product name) manufactured by Horiba, Ltd. (the same applies hereinafter).

Next, the second solution was stirred for 15 minutes to complete the reaction, and a solution containing a reaction product which is a precursor of the magnetoplumbite-type hexagonal ferrite powder (that is, a precursor-containing solution) was obtained.

Next, the precursor-containing solution was subjected to centrifugal separation (rotation speed: 3,000 rpm, rotation time: 10 minutes) three times, and the resulting precipitate was collected.

Next, the collected precipitate was dried in an oven at an internal atmosphere temperature of 95° C. for 12 hours to obtain an aggregate of particles consisting of the precursor (that is, precursor powder).

Then, the precursor powder was pulverized using a mortar and a pestle so that there is no particles having a particle size of 500 μm or more, and put in a muffle furnace, and the temperature in the furnace was set to a temperature condition of 1,100° C. in the atmosphere, followed by firing for 4 hours, thereby obtaining a magnetic powder 1.

-Producing of Magnetic Powder 2-

The magnetic powder 1 was pulverized using Wonder Crusher WC-3 (product name) manufactured by Osaka Chemical Co., Ltd. by setting a variable speed dial to "3" for 20 seconds, thereby obtaining a magnetic powder 2.

-Producing of Magnetic Powder 3-

The magnetic powder 1 was pulverized using Wonder Crusher WC-3 (product name) manufactured by Osaka Chemical Co., Ltd. by setting a variable speed dial to "5" for 60 seconds, thereby obtaining a magnetic powder 3.

-Producing of Magnetic Powder 4-

The magnetic powder 1 was pulverized using Wonder Crusher WC-3 (product name) manufactured by Osaka Chemical Co., Ltd. by setting a variable speed dial to "5" for 90 seconds, thereby obtaining a magnetic powder 4.

-Producing of Magnetic Powder 5-

The magnetic powder 1 was pulverized using Wonder Crusher WC-3 (product name) manufactured by Osaka Chemical Co., Ltd. by setting a variable speed dial to "5" for 120 seconds, thereby obtaining a magnetic powder 5.

-Producing of Magnetic Powder 6-

The magnetic powder 1 was pulverized using Absolute Mill (product name) manufactured by Osaka Chemical Co., Ltd. by setting a variable speed dial to "8" for 180 seconds, thereby obtaining a magnetic powder 6.

-Producing of Magnetic Powder 7-

The magnetic powder 1, the magnetic powder 4, and the magnetic powder 6 were mixed with each other and pulverized using Wonder Crusher WC-3 (product name) manufactured by Osaka Chemical Co., Ltd. by setting a variable speed dial to "1" for 10 seconds, thereby obtaining a magnetic powder 7.

-Producing of Magnetic Powder 8-

The magnetic powder 1 was pulverized using Wonder Crusher WC-3 (product name) manufactured by Osaka Chemical Co., Ltd. by setting a variable speed dial to "8" for 120 seconds, thereby obtaining a magnetic powder 8.

-Producing of Magnetic Powder 9-

The magnetic powder 1 was pulverized using Wonder Crusher WC-3 (product name) manufactured by Osaka Chemical Co., Ltd. by setting a variable speed dial to "3" for 60 seconds, thereby obtaining a magnetic powder 9.

-Producing of Magnetic Powder 10-

The magnetic powder 1, the magnetic powder 2, and the magnetic powder 4 were mixed with each other and pulverized using Wonder Crusher WC-3 (product name) manufactured by Osaka Chemical Co., Ltd. by setting a variable speed dial to "1" for 10 seconds, thereby obtaining a magnetic powder 10.

-Producing of Magnetic Powder 11-

A total amount of a raw material aqueous solution prepared by dissolving 57.0 g of iron (III) chloride hexahydrate [$FeCl_3 \cdot 6H_2O$], 27.8 g of strontium chloride hexahydrate [$SrCl_2 \cdot 6H_2O$], and 10.2 g of aluminum chloride hexahydrate [$AlCl_3 \cdot 6H_2O$] in 216.0 g of water, and a total amount of a solution prepared by adding 113.0 g of water to 181.3 g of 5 mol/L sodium hydroxide aqueous solution were added to 400.0 g of water kept at 35° C. and stirred, respectively, at a flow rate of 10 mL/min and the same timing, to obtain a first solution.

Next, after changing the temperature of the first solution to 25° C., 30.2 g of a 1 mol/L sodium hydroxide aqueous solution was added to obtain a second solution. The pH of the second solution was 9.5.

Next, the second solution was stirred for 15 minutes to complete the reaction, and a solution containing a reaction product which is a precursor of the magnetoplumbite-type hexagonal ferrite powder (that is, a precursor-containing solution) was obtained.

Next, the precursor-containing solution was subjected to centrifugal separation (rotation speed: 3,000 rpm, rotation time: 10 minutes) three times, and the resulting precipitate was collected.

Next, the collected precipitate was dried in an oven at an internal atmosphere temperature of 95° C. for 12 hours to obtain an aggregate of particles consisting of the precursor (that is, precursor powder).

Then, the precursor powder was pulverized using a mortar and a pestle so that there is no particles having a particle size of 500 μm or more, and put in a muffle furnace, and the temperature in the furnace was set to a temperature condition of 1,100° C. in the atmosphere, followed by firing for 4 hours, thereby obtaining a magnetic powder 11.

-Producing of Magnetic Powder 12-

The magnetic powder 11 was pulverized using Wonder Crusher WC-3 (product name) manufactured by Osaka Chemical Co., Ltd. by setting a variable speed dial to "5" for 120 seconds, thereby obtaining a magnetic powder 12.

-Producing of Magnetic Powder 13-

The magnetic powder 11 was pulverized using Absolute Mill (product name) manufactured by Osaka Chemical Co., Ltd. by setting a variable speed dial to "8" for 180 seconds, thereby obtaining a magnetic powder 13.

-Producing of Magnetic Powder 14-

A total amount of a raw material aqueous solution prepared by dissolving 57.0 g of iron (III) chloride hexahydrate [$FeCl_3 \cdot 6H_2O$], 22.3 g of strontium chloride hexahydrate [$SrCl_2 \cdot 6H_2O$], 2.6 g of barium chloride dihydrate [$BaCl_2 \cdot 2H_2O$], 1.5 g of calcium chloride dihydrate [$CaCl_2 \cdot 2H_2O$], and 10.2 g of aluminum chloride hexahydrate [$AlCl_3 \cdot 6H_2O$] in 216.0 g of water, and a total amount of a solution prepared by adding 113.0 g of water to 181.3 g of 5 mol/L sodium hydroxide aqueous solution were added to 400.0 g of water kept at 35° C. and stirred, respectively, at a flow rate of 10 mL/min and the same timing, to obtain a first solution.

Next, after changing the temperature of the first solution to 25° C., 39.8 g of a 1 mol/L sodium hydroxide aqueous solution was added to obtain a second solution. The pH of the obtained second solution was 10.5.

Next, the second solution was stirred for 15 minutes to complete the reaction, and a solution containing a reaction product which is a precursor of the magnetoplumbite-type hexagonal ferrite powder (that is, a precursor-containing solution) was obtained.

Next, the precursor-containing solution was subjected to centrifugal separation (rotation speed: 3,000 rpm, rotation time: 10 minutes) three times, and the resulting precipitate was collected.

Next, the collected precipitate was dried in an oven at an internal atmosphere temperature of 95° C. for 12 hours to obtain an aggregate of particles consisting of the precursor (that is, precursor powder).

Then, the precursor powder was pulverized using a mortar and a pestle so that there is no particles having a particle size of 500 μm or more, and put in a muffle furnace, and the temperature in the furnace was set to a temperature condition of 1,100° C. in the atmosphere, followed by firing for 4 hours, thereby obtaining a fired body.

Next, the obtained fired body was pulverized using Wonder Crusher WC-3 (product name) manufactured by Osaka Chemical Co., Ltd. by setting a variable speed dial to "5" for 120 seconds, thereby obtaining a magnetic powder 14.

-Producing of Magnetic Powder 15-

The magnetic powder 6 and the magnetic powder 10 were mixed with each other and pulverized using Wonder Crusher WC-3 (product name) manufactured by Osaka Chemical Co., Ltd. by setting a variable speed dial to "1" for 10 seconds, thereby obtaining a magnetic powder 15.

-Producing of Magnetic Powder 16-

The magnetic powder 10 was pulverized using Wonder Crusher WC-3 (product name) manufactured by Osaka Chemical Co., Ltd. by setting a variable speed dial to "1" for 10 seconds, thereby obtaining a magnetic powder 16.

1. Confirmation of Crystal Structure

The crystal structure of the magnetic material forming each magnetic powder of magnetic powder 1 to magnetic powder 16 (hereinafter, also referred to as "magnetic material 1 to magnetic material 16") was confirmed by an X-ray diffraction (XRD) method.

Specifically, it was confirmed whether or not the magnetoplumbite-type crystal structure is obtained and whether the crystal structure had a single phase or two crystal phase.

An X'Pert Pro (product name) manufactured by PANalytical which is the powder X-ray diffractometer was used as a measurement device. The measurement conditions are shown below.

-Measurement Conditions-
X-ray source: CuKα ray
[Wavelength: 1.54 Å (0.154 nm), output: 40 mA, 45 kV]
Scan range: 20°<2θ<70°
Scan interval: 0.05°
Scan speed: 0.75°/min As a result, it is confirmed that each of the magnetic materials 1 to 16 is a single-phase magnetoplumbite-type hexagonal ferrite having a magnetoplumbite-type crystal structure without the crystal structure other than the magnetoplumbite type.

2. Confirmation of Composition

The composition of each magnetic material of the magnetic materials 1 to 16 was confirmed by high frequency inductively coupled plasma (ICP) emission spectroscopy.

Specifically, a pressure-resistant container (beaker) containing 12 mg of each of powder and 10 mL of a 4 mol/L hydrochloric acid aqueous solution was held in an oven at a set temperature of 120° C. for 12 hours to obtain a solution. 30 mL of pure water was added to the obtained solution, which is then filtered using a 0.1 μm membrane filter. Elemental analysis of the filtrate obtained as described above was performed using a high frequency inductively coupled plasma (ICP) emission spectrometer [model number: ICPS-8100, Shimadzu Corporation].

Based on the obtained elemental analysis results, a content of each metal atom with respect to 100 atom % of iron atoms was obtained. Then, based on the obtained content, the composition of each of magnetic materials was confirmed. The composition of each magnetic material is shown below.

Magnetic Material 1 to Magnetic Material 10, Magnetic Material 15, and Magnetic Material 16: $SrFe_{(9.95)}Al_{(2.05)}O_{19}$
Magnetic Material 11 to Magnetic Material 13: $SrFe_{(9.70)}Al_{(2.30)}O_{19}$
Magnetic Material 14: $Sr_{(0.80)}Ba_{(0.10)}Ca_{(0.10)}Fe_{(9.83)}Al_{(2.17)}O_{19}$ 3. Measurement of Particle Size Distribution The particle size distribution based on number of each magnetic powder of the magnetic powders 1 to 16 was measured by a laser diffraction scattering method, and a mode (so-called mode diameter), a diameter at a cumulative percentage of 10%, and a diameter at a cumulative percentage of 90% were obtained.

Specifically, 500 mL of cyclohexanone was added to 10 mg of each magnetic powder and diluted, stirred using a shaker for 30 seconds, and the obtained liquid is set as a sample for particle size distribution measurement.

Next, the particle size distribution of the sample for particle size distribution measurement was measured by using a laser diffraction/scattering particle size distribution measurement device [product name: Partica LA-960, Horiba, Ltd.]. Based on the obtained particle size distribution based on number, the mode diameter (unit: μm) that is the mode, the diameter $D_{10}$ at a cumulative percentage of 10% (unit: μm), and the diameter $D_{90}$ at a cumulative percentage of 90% (The unit: μm) were obtained. In addition, a value of "$(D_{90}-D_{10})$/mode diameter" was calculated. The results are shown in Tables 1 to 3.

It was confirmed that, from the results of "1. Confirmation of Crystal Structure", "2. Confirmation of Composition", and "3. Measurement of Particle Size Distribution", among the magnetic powder 1 to the magnetic powder 16, the magnetic powder 2, the magnetic powder 4, the magnetic powder 5, the magnetic powder 12, the magnetic powder 14, and the magnetic powder 15 are the powder of the magnetoplumbite-type hexagonal ferrite of the disclosure.

4. Evaluation of Magnetic Properties

The coercivity (Hc) and saturation magnetization (σs) were measured as the magnetic properties of each magnetic powder of the magnetic powders 1 to 16.

Specifically, as the measurement device, a vibrating sample magnetometer (model number: TM-TRVSM5050-SMSL, Tamagawa Seisakusho) was used as the device under an environment of an atmosphere temperature of 23° C. and under conditions of a maximum applied magnetic field of 3,589 kA/m, and a magnetic field sweep speed of 1.994 kA/m/s (sec), and intensity of magnetization of the powder with respect to the applied magnetic field was measured. From the measurement results, a magnetic field (H)-magnetization (M) curve of each of powders was obtained. The coercivity (Hc) (unit: kA/m) and the saturation magnetization (σs) (unit: $Am^2/kg$) of each magnetic powder were obtained based on the obtained magnetic field (H)-magnetization (M) curve. The magnetic properties were evaluated based on the obtained values. The evaluation standards are shown below.

In a case where the evaluation result was A, it was determined that the magnetic powder had excellent magnetic properties. The results are shown in Tables 1 to 3.

(Evaluation Standards)

A: Both the coercivity (Hc) of 700 kA/m or more and the saturation magnetization (σs) of 35 $Am^2/kg$ or more are satisfied.

B: At least one of coercivity (Hc) of less than 700 kA/m and the saturation magnetization (σs) of less than 35 $Am^2/kg$ is satisfied.

5. Evaluation of Radio Wave Absorption Performance

The radio wave absorption performance of the radio wave absorption sheets (hereinafter, also referred to as "radio wave absorption sheet 1 to radio wave absorption sheet 16") produced by using each magnetic powder of the magnetic powders 1 to 16 was evaluated.

For the evaluation, a radio wave absorption sheet for evaluation produced by the following method was used.

9.0 g of the magnetic powder, 1.05 g of acrylonitrile butadiene rubber (NBR) (grade: JSR N215SL, JSR Corporation, binder), and 6.1 g of cyclohexanone were stirred and mixed with a stirring device [Product name: Awatori Neritaro ARE-310, Shinky Co., Ltd.], at a rotation speed of 2,000 rpm for 5 minutes to prepare a composition for a radio wave absorber. Next, the prepared composition for a radio wave absorber was applied onto an aluminum foil using an applicator to form a composition layer for a radio wave absorber. Next, the formed composition layer for a radio wave absorber was dried in an oven at an internal atmosphere temperature of 80° C. for 2 hours to form a radio wave absorption layer (thickness: 380 μm) on the aluminum foil to obtain a radio wave absorption sheet for evaluation.

A return loss (unit: dB) of the radio wave absorption sheet for evaluation obtained above was measured.

Specifically, as a measurement device, a return loss was measured by setting an incidence angle as 0° and a sweep frequency of 60 GHz to 90 GHz by a free space method using a vector network analyzer (product name: MS4647B) of Anritsu Corporation and a horn antenna (product name: RH19R) of Keycom Co., Ltd. The radio wave absorption performance of the radio wave absorption sheet 1 to the radio wave absorption sheet 10 and the radio wave absorption sheet 14 to the radio wave absorption sheet 16 were evaluated based on values of the return loss at 76.5 GHz, and the radio wave absorption performance of the radio wave absorption sheet 11 to the radio wave absorption sheet 13 were evaluated based on values of the return loss at 85.0 GHz. The evaluation standards are shown below.

In a case where the evaluation result was A, it was determined that the radio wave absorption sheet had excellent radio wave absorption performance. The results are shown in Tables 1 to 3.

(Evaluation Standards)

A: The return loss is 10 dB or more.

B: The return loss is less than 10 dB.

6. Evaluation of Sheet Hardness

The sheet hardness of the radio wave absorption sheets (that is, radio wave absorption sheet 1 to radio wave absorption sheet 16) produced by using each magnetic powder of the magnetic powders 1 to 16 was evaluated. For the evaluation, a radio wave absorption sheet for evaluation produced by the following method was used.

9.0 g of the magnetic powder, 1.05 g of acrylonitrile butadiene rubber (NBR) (grade: JSR N215SL, JSR Corporation, binder), and 6.1 g of cyclohexanone were stirred and mixed with a stirring device [Product name: Awatori Neritaro ARE-310, Shinky Co., Ltd.], at a rotation speed of 2,000 rpm for 5 minutes to prepare a composition for a radio wave absorber. Next, the prepared composition for a radio wave absorber was applied onto a glass plate using an applicator to form a composition layer for a radio wave absorber. Next, the formed composition layer for a radio wave absorber was dried in an oven at an internal atmosphere temperature of 80° C. for 2 hours to form a radio wave absorption layer (thickness: 380 μm, planar shape) on the glass plate. Then, the radio wave absorption layer was peeled off from the glass plate, and the peeled radio wave absorption layer was cut into a strip of 20 mm×70 mm to obtain a radio wave absorption sheet for evaluation.

A breaking strength (unit: MPa) of the radio wave absorption sheet for evaluation obtained above was measured.

Specifically, the radio wave absorption sheet for evaluation was pulled in a longitudinal direction at a speed of 20 m/s (sec) using Strograph V1-C (product name) manufactured by Toyo Seiki Seisakusho Co., Ltd. and a load applied to the radio wave absorption sheet for evaluation immediately before breaking was set as the breaking strength. The sheet hardness was evaluated based on the obtained value of breaking strength. The evaluation standards are shown below.

In a case where the evaluation result was A, it was determined that the radio wave absorption sheet had excellent in sheet hardness, even in a case where it is formed as a thin film. The results are shown in Tables 1 to 3.

(Evaluation Standards)

A: Breaking strength is 2 MPa or more.

B: Breaking strength is less than 2 MPa.

TABLE 1

| | | Comparative Example 1 | Comparative Example 2 | Comparative Example 3 | Example 1 | Comparative Example 4 | Comparative Example 5 |
|---|---|---|---|---|---|---|---|
| Kind of magnetic powder | | Magnetic powder 1 | Magnetic powder 2 | Magnetic powder 9 | Magnetic powder 3 | Magnetic powder 7 | Magnetic powder 10 |
| Kind of radio wave absorption sheet | | Radio wave absorption sheet 1 | Radio wave absorption sheet 2 | Radio wave absorption sheet 9 | Radio wave absorption sheet 3 | Radio wave absorption sheet 7 | Radio wave absorption sheet 10 |
| Mode diameter [μm] | | 262.4 | 19.9 | 12.3 | 8.8 | 8.2 | 8.2 |
| $D_{10}$[μm] | | 7.0 | 12.0 | 6.9 | 5.5 | 1.8 | 3.2 |
| $D_{90}$[μm] | | 305.0 | 28.0 | 20.5 | 12.5 | 67.7 | 38.0 |
| $(D_{90} - D_{10})$/mode diameter | | 1.14 | 0.80 | 1.11 | 0.80 | 8.04 | 4.24 |
| Magnetic properties | Evaluation result | A | A | A | A | A | A |
| | Coercivity (Hc) [kA/m] | 770.2 | 771.0 | 772.3 | 774.2 | 734.5 | 772.3 |
| | Saturation magnetization (σs) [Am²/kg] | 42.1 | 42.3 | 42.0 | 42.3 | 40.2 | 41.4 |
| Radio wave absorption performance | Evaluation result | — | A | A | A | A | A |
| | Return loss (76.5 GHz) [dB] | Not measurable | ≥10 | ≥10 | ≥10 | ≥10 | ≥10 |
| Sheet hardness | Evaluation result | B | B | B | A | B | B |
| | Breaking strength [MPa] | 0.2 | 0.7 | 1.4 | ≥2 | 0.5 | 1.3 |

| | | Example 2 | Example 3 | Comparative Example 6 | Comparative Example 7 | Example 6 | Comparative Example 10 |
|---|---|---|---|---|---|---|---|
| Kind of magnetic powder | | Magnetic powder 4 | Magnetic powder 5 | Magnetic powder 8 | Magnetic powder 6 | Magnetic powder 15 | Magnetic powder 16 |
| Kind of radio wave absorption sheet | | Radio wave absorption sheet 4 | Radio wave absorption sheet 5 | Radio wave absorption sheet 8 | Radio wave absorption sheet 6 | Radio wave absorption sheet 15 | Radio wave absorption sheet 16 |
| Mode diameter [μm] | | 6.7 | 5.9 | 4.8 | 2.3 | 5.1 | 7.0 |
| $D_{10}$[μm] | | 4.1 | 3.4 | 2.2 | 1.5 | 2.1 | 2.8 |
| $D_{90}$[μm] | | 9.5 | 7.7 | 7.6 | 3.2 | 16.8 | 26.0 |
| $(D_{90} - D_{10})$/mode diameter | | 0.81 | 0.73 | 1.13 | 0.74 | 2.88 | 3.31 |
| Magnetic properties | Evaluation result | A | A | B | B | A | A |

TABLE 1-continued

|   |   |   |   |   |   |   |   |
|---|---|---|---|---|---|---|---|
| | Coercivity (Hc) [kA/m] | 767.7 | 772.6 | 680.2 | 612.1 | 773.4 | 774.3 |
| | Saturation magnetization ($\sigma$s) [Am$^2$/kg] | 42.4 | 41.8 | 41.1 | 40.6 | 42.0 | 41.9 |
| Radio wave absorption performance | Evaluation result | A | A | B | B | A | A |
| | Return loss (76.5 GHz) [dB] | ≥10 | ≥10 | <10 | <10 | ≥10 | ≥10 |
| Sheet hardness | Evaluation result | A | A | A | A | A | B |
| | Breaking strength [MPa] | ≥2 | ≥2 | ≥2 | ≥2 | ≥2 | 1.4 |

TABLE 2

| | | Comparative Example 8 | Example 4 | Comparative Example 9 |
|---|---|---|---|---|
| Kind of magnetic powder | | Magnetic powder 11 | Magnetic powder 12 | Magnetic powder 13 |
| Kind of radio wave absorption sheet | | Radio wave absorption sheet 11 | Radio wave absorption sheet 12 | Radio wave absorption sheet 13 |
| Mode diameter [μm] | | 245.7 | 5.5 | 2.8 |
| $D_{10}$[μm] | | 12.1 | 1.9 | 0.6 |
| $D_{90}$[μm] | | 335.8 | 8.8 | 4.5 |
| ($D_{90} - D_{10}$)/mode diameter | | 1.32 | 1.25 | 1.39 |
| Magnetic properties | Evaluation result | A | A | B |
| | Coercivity (Hc) [kA/m] | 806.5 | 800.2 | 604.8 |
| | Saturation magnetization ($\sigma$s) [Am$^2$/kg] | 40.2 | 40.5 | 38.9 |
| Radio wave absorption performance | Evaluation result | — | A | B |
| | Return loss (85.0 GHz) [dB] | Not measurable | ≥10 | <10 |
| Sheet hardness | Evaluation result | B | A | A |
| | Breaking strength [MPa] | 0.2 | ≥2 | ≥2 |

TABLE 3

| | | Comparative Example 8 | Example 4 | Comparative Example 9 |
|---|---|---|---|---|
| Kind of magnetic powder | | Magnetic powder 11 | Magnetic powder 12 | Magnetic powder 13 |
| Kind of radio wave absorption sheet | | Radio wave absorption sheet 11 | Radio wave absorption sheet 12 | Radio wave absorption sheet 13 |
| Mode diameter [μm] | | 245.7 | 5.5 | 2.8 |
| $D_{10}$[μm] | | 12.1 | 1.9 | 0.6 |
| $D_{90}$[μm] | | 335.8 | 8.8 | 4.5 |
| ($D_{90} - D_{10}$)/mode diameter | | 1.32 | 1.25 | 1.39 |
| Magnetic properties | Evaluation result | A | A | B |
| | Coercivity (Hc) [kA/m] | 806.5 | 800.2 | 604.8 |
| | Saturation magnetization ($\sigma$s) [Am$^2$/kg] | 40.2 | 40.5 | 38.9 |
| Radio wave absorption performance | Evaluation result | — | A | B |
| | Return loss (85.0 GHz) [dB] | Not measurable | ≥10 | <10 |
| Sheet hardness | Evaluation result | B | A | A |
| | Breaking strength [MPa] | 0.2 | ≥2 | ≥2 |

As shown in Tables 1 to 3, powders of magnetoplumbite-type hexagonal ferrite of Examples 1 to 6 (that is, the magnetic powder 3 to the magnetic powder 5, the magnetic powder 12, the magnetic powder 14, and the magnetic powder 15) had high coercivity (H) and excellent magnetic properties.

In addition, it was confirmed that the radio wave absorption sheets of Examples 1 to 6 (that is, the radio wave absorption sheet 3 to the radio wave absorption sheet 5, the radio wave absorption sheet 12, the radio wave absorption sheet 14, and the radio wave absorption sheet 15) had excellent radio wave absorption performance and sheet hardness, even in a case where it is formed as a thin film having a thickness of 380 μm.

On the other hand, at least one of the radio wave absorption performance and the sheet hardness of the radio wave absorption sheets of Comparative Example 2 to Comparative Examples 7, Comparative Example 9, and Comparative Example 10 (that is, the radio wave absorption sheet 2, the radio wave absorption sheet 6 to the radio wave absorption sheet 10, the radio wave absorption sheet 13, and the radio wave absorption sheet 16) was deteriorated, compared to the radio wave absorption sheets of Example 1 to Example 6 (that is, the radio wave absorption sheet 3 to the radio wave absorption sheet 5, the radio wave absorption sheet 12, the radio wave absorption sheet 14, and the radio wave absorption sheet 15).

In addition, the radio wave absorption sheets of Comparative Example 1 and Comparative Example 8 (that is, the radio wave absorption sheet 1 and the radio wave absorption sheet 11) were partially deficient due to the presence of coarse particles, and accordingly, accurate measurement could not be performed.

The contents of JP2018-159192 filed on Aug. 28, 2018 and JP2019-098735 filed on May 27, 2019 are incorporated herein by reference.

All of the documents, the patent applications, and the technology standards described here are incorporated here by reference.

What is claimed is:

1. A powder of a magnetoplumbite-type hexagonal ferrite which is an aggregate of particles of a compound represented by Formula (1), and
    wherein, in a particle size distribution based on number measured by a laser diffraction scattering method, in a case where a mode value is defined as a mode diameter, a diameter at a cumulative percentage of 10% is defined as $D_{10}$ and a diameter at a cumulative percentage of 90% is defined as $D_{90}$, the mode diameter is equal to or greater than 5 μm and less than 10 μm and an expression of $(D_{90}-D_{10})/\text{mode diameter} \leq 3.0$ is satisfied,

$$AFe_{(12-x)}Al_xO_{19} \quad \text{Formula (1)}$$

in Formula (1), A represents at least one metal element selected from the group consisting of Sr, Ba, Ca, and Pb, and x satisfies $1.5 \leq x \leq 8.0$.

2. The powder of a magnetoplumbite-type hexagonal ferrite according to claim 1,
    wherein x in Formula (1) satisfies $1.5 \leq x \leq 6.0$.

3. The powder of a magnetoplumbite-type hexagonal ferrite according to claim 1,
    wherein a crystal phase is a single phase.

4. The powder of a magnetoplumbite-type hexagonal ferrite according to claim 1,
    wherein the powder of the magnetoplumbite-type hexagonal ferrite is used for a radio wave absorber.

5. A method for producing the powder of a magnetoplumbite-type hexagonal ferrite according to claim 1, the method comprising:
    a step A of obtaining a reaction product containing Fe, Al, and the at least one metal element selected from the group consisting of Sr, Ba, Ca, and Pb by a liquid phase method; and
    a step B of drying the reaction product obtained in the step A, thereby obtaining a dried product; and
    a step C of any one of a step of obtaining a fired product by firing the dried product obtained in the step B and pulverizing the obtained fired product or a step of obtaining a pulverized product by pulverizing the dried product obtained in the step B and firing the obtained pulverized product.

6. The method for producing the powder of a magnetoplumbite-type hexagonal ferrite according to claim 5,
    wherein the step A includes a step of mixing an aqueous solution containing an Fe salt, an Al salt, and a salt of the at least one metal element with an alkali aqueous solution, thereby obtaining a reaction product.

7. A radio wave absorber comprising:
    the powder of a magnetoplumbite-type hexagonal ferrite according to claim 1; and
    a binder.

8. The powder of a magnetoplumbite-type hexagonal ferrite according to claim 1,
    wherein A in Formula (1) is at least one metal element selected from the group consisting of Sr, Ba, and Ca.

9. The powder of a magnetoplumbite-type hexagonal ferrite according to claim 1,
    wherein A in Formula (1) includes Sr.

10. The powder of a magnetoplumbite-type hexagonal ferrite according to claim 1,
    wherein the mode diameter is 5 μm to 9 μm.

* * * * *